May 13, 1941.  S. J. BACHARDY  2,242,162
COFFEE MAKING APPARATUS
Filed Feb. 16, 1939   2 Sheets-Sheet 1

INVENTOR:
S. J. Bachardy
BY Robbs Robs
ATTORNEYS.

Patented May 13, 1941

2,242,162

UNITED STATES PATENT OFFICE 2,242,162

COFFEE MAKING APPARATUS

Stephen J. Bachardy, Allentown, Pa.

Application February 16, 1939, Serial No. 256,795

15 Claims. (Cl. 219—44)

This invention involves certain improvements in coffee making apparatus, and particularly involves a new and advantageous construction of coffee percolating vessel or pot.

A primary object of the invention has been to provide a coffee making vessel or pot of the class described, wherein the liquid used for making the coffee is heated by steam. It is found that the employment of steam according to the above method does not remove from the coffee bean or granules through which the coffee water is percolated, acid contained in said granules, or granular particles, and therefore, produces coffee of excellent drinking qualities, without deleterious effects upon the user.

In the carrying out of the invention, a percolator type of construction for the coffee vessel or pot is employed, and associated therewith is a water vessel or container for holding water to be converted into steam, said container being wholly separate from the coffee pot or vessel proper.

The water in the said associated water container is converted into steam by suitable heating means, preferably electrical, and the steam is conducted preferably to the bottom of the coffee pot through a pipe or conduit. The said pipe or conduit near the bottom portion of the coffee pot is provided with a special inlet valve which enables the water in the coffee pot to be used for making the coffee to be drawn into said pipe or conduit by the action of the steam passing from the steam generating container into the water containing chamber of the coffee pot. In this manner, the water in the coffee pot for making the beverage is caused to circulate properly to effect percolation thereof, through the coffee granules, much after the manner of the ordinary percolation easily used for coffee making generally.

Of course, the steam supplied from the steam generating vessel to the coffee making chamber of the pot is condensed in the latter, when it unites with the water in said pot and the water is heated by the action of the said steam in a manner which will be more apparent hereinafter.

By the use of the invention, embodying especially the steam generating chamber and its cooperation with the coffee pot, it will be evident that the time of percolation of the coffee water through the coffee granules may be predetermined, and varied, by the amount of water that is placed preliminarily in the steam generating vessel. This control is obtained by the employment of heating elements in the steam generating vessel, through which heating elements an electric current passes when water is disposed in the steam generating vessel and the said heating elements are connected electrically with a source of supply of current.

Thus, since the water in the steam generating vessel is converted into steam for a period depending upon the quantity of such water, and this steam is exclusively used for heating the coffee water in the pot, the variation in the period of percolation of the coffee water may be obtained, since upon complete conversion of the water in the generating water into steam, the electrical conduction of current through the heating elements will cease.

Another feature of the invention resides in the mounting of the heating elements in relation to certain contact members in the steam generating vessel so that after the water in said vessel or container ceases to electrically connect the heating elements, the said contacts may still be electrically connected and cause a small amount of current to pass through a small portion of the water in the steam container sufficiently to provide a relatively small quantity of steam generation that will maintain the contents of the coffee pot warm, or hot, for a considerable period of time, after the current has ceased to pass through the heating elements proper.

The invention involves also the provision of peculiar heating element structures for automatically controlling the electric current consumption, or use of the heating medium, so that a maximum amount of heat will be supplied to the water in the steam generating vessel at the commencement of the heating operation for the water in the cooking or coffee receptacle, the automatic action being to gradually reduce the amount of heating medium or electric current consumed as the heating of the water in the coffee pot or percolating vessel increases thereby obtaining a uniformity of heating of said last mentioned water.

The invention involves other and detail features of construction and operation of the coffee making apparatus, all of which will be more clear upon reference to the accompanying drawings, in which.

My invention is described in detail as follows, in conjunction with the accompanying drawings, and in this description and said drawings, similar reference characters refer to similar parts.

Figure 1:
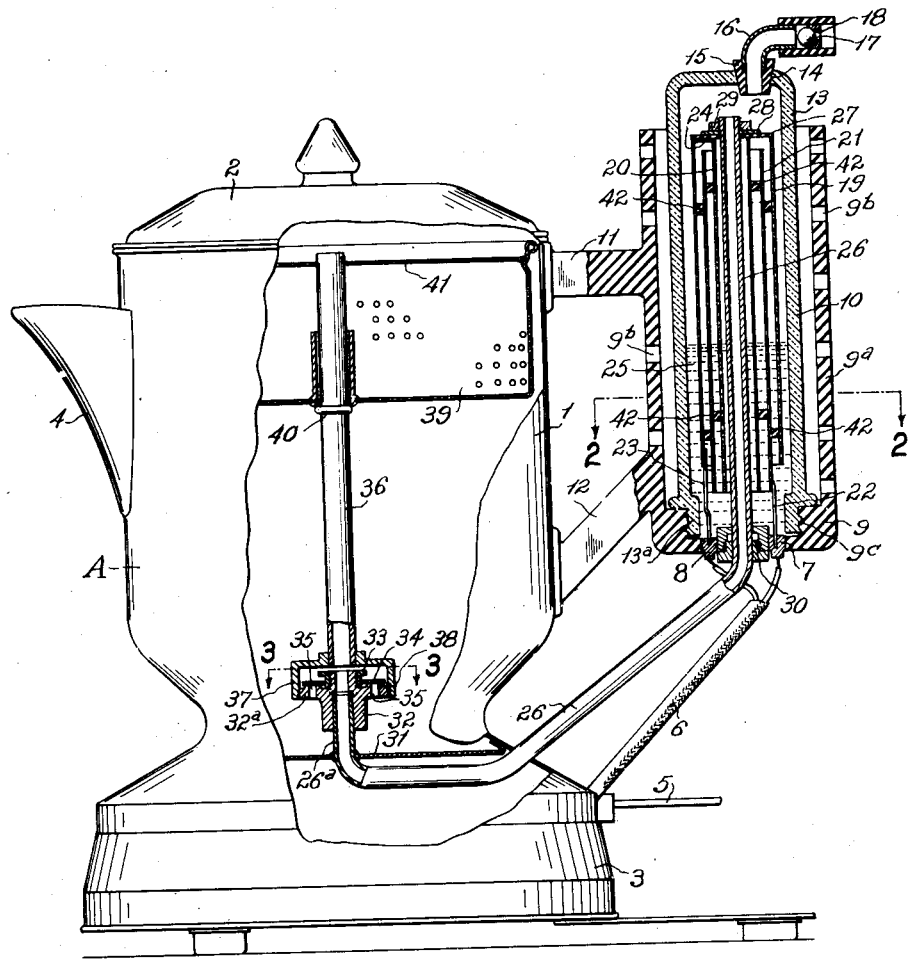
Figure 1 is a front elevation of a coffee making apparatus embodying the invention, the coffee pot or vessel proper being broken away to show the arrangement of interior parts and the steam generating container or vessel being illustrated in section to bring out more fully its construction.
Figure 3:
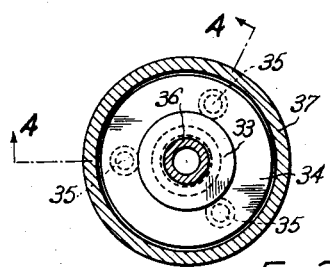
Figure 3 is a sectional view on the line 3—3 of Figure 1, looking downwardly.
Figure 2:
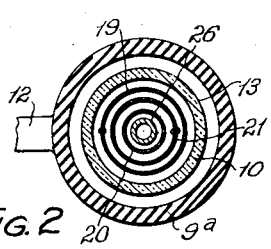
Figure 2 is a sectional view on the line 2—2 of Figure 1, looking downwardly in the direction of the arrows.
Figure 4:
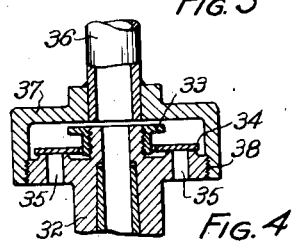
Figure 4 is a vertical sectional view taken about on the line 4—4 of Figure 3.

A denotes the coffee pot or vessel which is, generally speaking, of a common type as to its main features of construction in that it comprises the water compartment 1, the top 2, the base 3, and the pouring spout 4. At one side of the base 3 are located contact members 5, two of which are used, though only one is shown in Figure 1 because of the elevational view. These contact members 5 may be engaged with an ordinary terminal plug attached to electric wires leading to a source of electric current as well known. Electric wires lead from the contact members 5 upwardly, as shown at 6, and their ends are connected with conductive terminals 7 and 8 disposed in the bottom portion of a closure 9 for the steam generating vessel or container 10.

Preferably the closure 9 is made with the upwardly extending handle or sleeve 9a, suitably apertured as at 9b to permit the passing off of heat, said sleeve 9a providing also a handle joined to the pot A by the upper arm 11, and the lower arm 12. The parts 9, 9a, 11 and 12 may be made of Bakelite or any suitable insulating material, if desired.

In the handle or sleeve 9a is arranged the steam generating container or vessel 13, which is preferably made of specially processed glass, adapted to resist heat. The well known "Pyrex" composite material may be employed, if desired, and the container 13 will, therefore, be transparent, so that the amount of water in the container may be observed and regulated by visibility established through the openings 9b, or vertical slots, that may be formed in the sleeve or handle 9a. The container 13, when removed from the member 9, is open at its lower end and is provided with a screw threaded neck 13a at said lower end, adapted to be attached to the closure portion 9c and handle 9a by the screw threads 9c on the latter and on said neck.

At its upper end, the steam generating container 13 has a filling opening 14, normally closed by a plug or cork 15, and a small vent tube 16 passes through said plug 15 and is provided with a check valve 17 adapted to open inwardly from its seat 18 to admit air into the container 13.

Within the container 13 is disposed a heating means for heating water placed in the container and causing the generation of steam thereby. The heating means may take different forms but as illustrated consists of an outer tubular heating element 19, and inner similar element 20, and an intermediate heating element 21. The intermediate heating element is connected at its lower end by a contact pin 22 with the electric terminal member 7, previously mentioned. The outer heating element 19 is connected at its lower end by a contact pin 23 with the electric terminal member 8.

At their upper ends, the outer tubular or cylindrical heating element 19 and the inner similar element 20 are connected together by a bridging contact 24.

By the construction of the heating device as described, when water is placed in the container or vessel 13, as shown at 25, said water will cause electric current to pass across the space between the inner heating member 21 and the heating members 19 and 20, between which the member 21 is disposed, when the electric current is supplied to the terminals 7 and 8 through the wires 6 and contact members 5 connected with the suitable plug of a main line circuit.

Entering the closure 9 at its central portion preferably, and passing upwardly in the steam generating container 13 is the steam pipe or conduit 26, the upper end of which is open in the space near the upper end of the container 13. This conduit may be made of metal and in order to hold the heating elements 19, 20 and 21 fairly rigid, an insulating disc 27 may be seated on the upper ends of the members 19 and 20, and held in place by a washer 28 and nut 29, the latter screwed upon the upper threaded end of the pipe 26.

The pipe 26 leads through the bottom closure 9, where a stuffing box or gasket means 30 may be provided to prevent leakage of the water in the container 13, and from thence the pipe 26 passes downwardly and then upwardly through an opening in the bottom 31 of the coffee pot A.

On the upwardly projecting portion 26a of the pipe 26 is mounted a sleeve 32, which is externally threaded at its upper portion to receive a nut 33 internally threaded to screw thereon. The nut 33, externally thereof, freely receives thereon a valve 34 of disc-like form, which rests upon a flange 32a projecting outwardly from the upper portion of the sleeve 32. In this flange 32a are water entrance openings 35 permitting the water in the vessel or pot A to pass from the chamber 1 through the openings 35, by the valve 34 upwardly above the nut 33 to enter the percolating pipe 36. The pipe 36 is provided with a valve casing member 37 attached to its lower end and having screw threaded connection at 38 with the outer threaded portion of the flange 32a.

The arrangement of the parts intermediate the percolating pipe 36 and the extension 26a of the pipe 26 permits of access to the chamber between the parts 37 and 32a in which chamber the valve 34 is movable. Normally the pipe 36 remains within the vessel A and does not have to be removed in the ordinary use of the coffee making apparatus.

At its upper portion the percolating pipe 36 carries the perforated coffee granule receptacle 39 and a shoulder 40 on the pipe 36 supports the receptacle 39 in a removable manner very much the same as these coffee granule containing receptacles are supported today in percolator type coffee pots or apparatus.

The receptacle 39 is equipped with the usual cover or top 41 removably fitted into its upper portion and having a central opening through which the percolator pipe 36 passes at the upper terminal of the latter. The construction of the heaters 19, 20 and 21 is such that as a unit they may be removed from the steam generating vessel 13, suitable small insulating blocks 42 being interposed between the cylinders of the several concentric heating elements. The removal of the heating unit thus referred to may be effected by unscrewing the steam generating container 13 from the closure member 9 and sleeve 9a unit, and lifting the container 13 therefrom. Thereupon, by unscrewing the nut 29 and detaching the parts 28 and 27 the heating unit may be elevated bodily and detached by the disengagement of its contact pins 22 and 23 from the terminal members 7 and 8 respectively. Thus, if anything happens to the heating unit to reduce its efficiency, or render it inoperative, it may be readily replaced by a fresh unit at any time, and this operation may be performed very quickly.

It is not necessary to use a combined inner and outer heating element structure composed of the parts 19 and 20 with an intermediate element 21, if it is desired to merely use two spaced such elements instead of three. This part of the invented construction is not material except that the heating elements, if two are provided, shall carry the pins 22 and 23 for effecting the terminal electric connections.

With the foregoing construction in view, the operation of my coffee making apparatus is as follows:

The coffee granule receptacle 39 will be filled with the usual quantity of coffee granules per cup of coffee to be made. Thus, if four cups of coffee are desired, customarily four tablespoonfuls of coffee will be placed in the receptacle 39, and four cups of water placed in the chamber 1 of the pot A. Of course, if stronger coffee is desired, the quantity of coffee may be increased depending upon the desire of the persons drinking the coffee. The parts will all be arranged generally as shown in Figure 1 for use of the apparatus.

Next, the plug or closure 15 will be removed from the top of the steam generating vessel 13, and there will be poured into the said vessel 13 a suitable quantity of water to be converted into steam. In practice, if the vessel 13 is filled about half full, coffee of very excellent strength may be produced. If weak coffee is desired, a lesser amount of water will be put in the container 13, and if very strong coffee is desired, a larger amount of such water will be used. The water having been placed in the container 13, the plug 15 is replaced in the opening 14.

The apparatus is now ready for the making of the coffee beverage and the operator will connect the contact members 5 at the base of the coffee pot with the terminal plug of an electric circuit in the customary way.

As soon as this connection is effected, current is supplied through wires 6 to the heating elements 19, 20, and 21, the current passing through the water 25 and heating elements in the vessel or container 13, as described, and continuing to do this until the water in said container has been used and converted into steam so that said water is consumed to a point below the lower ends of the heating elements 19 to 21 inclusive.

The conversion of the water into steam generates sufficient steam in the vessel 13 which passes from the upper end of the vessel through the pipe 26 into the chamber 1 of the coffee pot through the percolator pipe 36. As the steam enters the pipe 36 by suction or vacuum action, it draws into said pipe 36 the water in the lower portion of the chamber 1, said water passing through the valved openings 35 and entering the percolator pipe 36 just above the nut 33, previously described. The steam acting on the water in the chamber 1 carries the water up with a percolating effect by producing water plugs in the pipe 36 which overflow at the upper end of the pipe and pass downwardly through the receptacle 39 and the granular coffee contained in the latter.

So far as the terminal members 5 are connected with the electric current, the water in the container 13 will be boiled off in the form of steam in the manner stated. First availing of the use of the heating elements to produce the boiling or steam generation, and later, when the water reaches a level below the heating elements in the container 13, it will connect the terminal pins 22 and 23, and the current will pass across between these pins through said water. But, of course, the rate of generation of steam under the latter conduits is very low, but it will be sufficient to maintain the contents of the receptacle 1 hot for a long period of time, if so desired, as long as there is water in the bottom of the container 13, and the electric current passes through said water at the termination pins 22 and 23. After the water is entirely consumed in the container 13, the current ceases to flow with an automatic cut off effect obviously; or, if it is not desired particularly to keep the contents of the pot A warm, after the making of the coffee, the terminal plug may be pulled off the contact members 5, and the heating effect obtained by generation of steam in the container 13 will cease.

From the foregoing, it will be understood that the time of heating of the coffee in the pot A with percolating effect may be controlled by correspondingly filling the container 13 with varying amounts of water and this is an important advantageous action of the apparatus. Likewise, it will be apparent that no direct heating of the water in the vessel or pot A is obtained after the usual manner of the use of such pots but the heating of the coffee liquid is effected indirectly through the entering of steam into the chamber 1 and the condensation of said steam when it reaches the water in said chamber.

Figure 5:
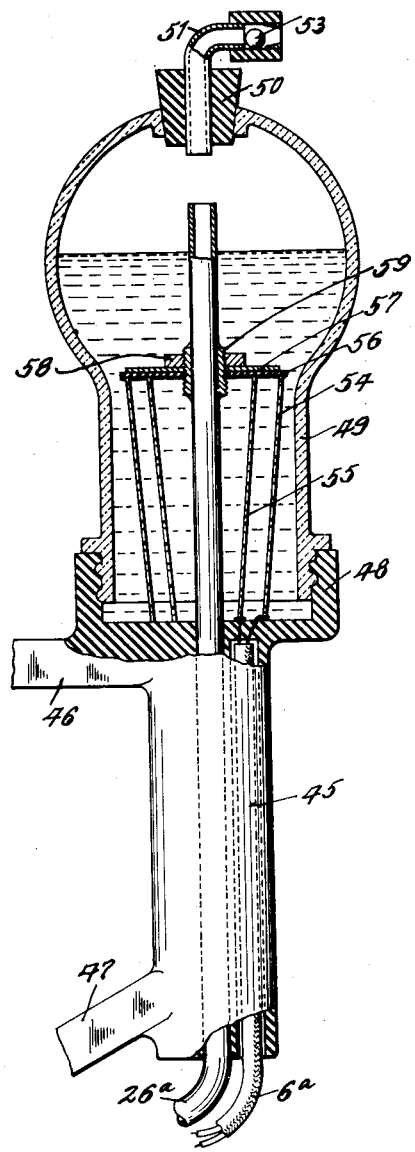
Figure 5 is a sectional view of a modification of the invention, wherein the steam generating vessel and heating appliances therein are separate from but mounted upon the handle for the coffee pot, this structure affording advantages that will be apparent under practical conditions of use.

Reference is made to Figure 5, wherein a modification of my invention is disclosed. According to this construction the handle for the coffee pot or percolating receptacle is designated 45 and will be joined with the body of the receptacle by the arms 46 and 47, that correspond with the arms 11 and 12 respectively, as previously described in regard to the construction of Figure 1. The handle 45 will be made of some suitable non-conducting substance, as regards heat and composition material, or a substance like "Bakelite," or the like, may be employed. The handle 45 is provided with suitable openings longitudinally or vertically therethrough, through one of which openings the steam pipe 26a passes upwardly from the point of connection thereof with the percolating receptacle and extends through the top of the handle into the steam generating vessel 49 which functions similarly to the receptacle or vessel 13 previously described. The steam generating vessel 49 may be made of "Pyrex" glass or the like so that the level of the water introduced into the said receptacle may be observed and regulated as desirable according to the principles of the invention previously described.

At its lower end, the vessel 49 is screw threadedly connected with the hollow upper end portion 48 of the handle 45.

Also longitudinally and vertically through the handle 45 extends the electrical conductor unit 6a comprising the wires which lead to the terminals 5 as illustrated in Figure 1, the upper end of said conductor unit 6a being arranged so that the wires thereof connect with the terminal members seated on the bottom of the hollow extension 46 at the upper end of the handle 45.

At its upper end the steam generating vessel 49 will have a filling closure or plug 50 provided with the vent pipe 51 and the cooperating check valve 52 as previously set forth in relation to the first described type of my apparatus.

Within the vessel 49 are disposed the heating members or elements 54 and 55, two of which are used in this construction instead of three, such as are designated 19, 20 and 21 in the Figure 1 construction, and the elements or members 54 and 55 are provided with horizontal perforations or apertures similar to those used for the corresponding members 19, 20 and 21, according to the construction of Figure 1.

The heating elements 54 and 55 are concentrically arranged spaced from each other, and taper toward their lower ends, each element resting upon an adjacent terminal contact of the conductor unit 6a current supply wires, as seen in Figure 5.

The units 54 and 55 are displaceable vertically for purposes of removal and for cleaning if required, and the tapered construction has a special function. At the top portions thereof the heating elements 54 and 55 are held in position by an insulator plate 56, a washer member 57 and a nut 58 that screws upon the threaded portion 59 of the upper portion of the steam pipe 26a within the vessel 49.

The construction of Figure 5 is advantageous in that the steam generating vessel 49 and its enclosed parts are arranged above the handle 45 eliminating the necessity of the special construction of such handle as found in the Figure 1 construction. Additionally, the tapered form of the heating elements 54 and 55 is such that it will be evident that as the level of the water in the vessel 49 lowers and moves gradually downwardly of the elements 54 and 55, the current passing between the heating elements and bridged by the water itself to maintain the circuit of current flow, will gradually decrease. The maximum amount of current will be supplied so long as the water level is above the members 54 and 55 or at the uppermost portions of said members at which the level of the water is adjusted.

Of course, at the beginning of the use of the apparatus a maximum amount of current is desired for facilitating the accelerated heating of the water in the percolating vessel A by the steam generated in the vessel 49. However, after the initial and early heating of the water in the vessel A, a less amount of steam is required to maintain such heating and it is desirable that the current consumption for the operation of the apparatus be cut down gradually and this is automatically effected by the lowering of the level of the water in the vessel 49 as said level moves downwardly along the perforated members 54 and 55.

The above operation of the heating elements 54 and 55 finds a corresponding operation in the action of the heating elements 19, 20 and 21, as described in reference to the apparatus of Figures 1 to 4 inclusive, except that the latter are not tapered and also that the apparatus of Figure 5 does not employ the terminal members 22 and 23.

Having thus described my invention, what I claim as new and desire to secure by Letters Patent of the United States, is:

1. In coffee making apparatus, in combination, a coffee pot or vessel comprising a water chamber, a coffee holding receptacle at the upper portion of said water chamber, a percolator pipe in said chamber to supply water to the coffee in the coffee holding receptacle, a water container separate from the pot and adapted to contain water for the generation of steam in said container, electrical heating elements in the container adapted to be conductively connected for passing of an electric current therethrough by water in the container, means for supplying electric current to said heating elements, a steam pipe leading from the upper portion of the water container to the percolator pipe, and means for establishing communication between the percolator pipe and the water holding area of the water chamber of the pot, the water received in the water container acting as a timing means for maintaining the heating action of the heating elements incident to the conversion of said water into steam that passes to the percolator pipe of the pot.

2. Coffee making apparatus as claimed in claim 1 combined with contact pins supporting the heating elements in the water container and adapted to be conductively connected by the water in said container when the level of said water reaches a point below the heating elements whereby current may be caused to pass through the water at the bottom of the container below the heating elements, for generating sufficient steam to maintain beverage coffee already made in the coffee pot hot subsequent to the production of the said beverage coffee in the said pot.

3. Coffee making apparatus as claimed in claim 1, combined with a handle for the pot which handle constitutes a receptacle enclosing the water container.

4. Coffee making apparatus as claimed in claim 1, combined with a handle for the coffee pot attached thereto and offstanding therein, said handle including a hollow body surrounding the steam generating water container and forming a closure for the lower end of said water container.

5. In percolating apparatus of the class described, in combination, a percolating vessel or receptacle, a water percolating pipe therein, a steam generating container associated with the said vessel and adapted to receive water from which steam may be generated, means for heating water in the steam generating vessel, a steam pipe connecting the steam generating container with the percolating pipe of the percolating vessel, and means whereby the steam passing to the percolating vessel from said steam pipe and the said container will effect flowing percolation of water in the percolating vessel through the percolating pipe of the latter, the percolating vessel being provided with a handle having an extension at its upper end forming the bottom portion of the container.

6. In percolating apparatus of the class described, in combination, a percolating vessel or receptacle, a water percolating pipe therein, a steam generating container associated with the said vessel and adapted to receive water from which steam may be generated, means for heating water in the steam generating vessel, a steam pipe connecting the steam generating container with the percolating pipe of the percolating vessel, and means whereby the steam passing to the percolating vessel from said steam pipe and the said container will effect flowing percolation of water in the percolating vessel through the percolating pipe of the latter, the percolating vessel being provided with a handle having an extension at its upper end forming the bottom portion of the container, the body of the steam generating container being detachably connected to the said bottom portion provided by the handle.

7. In coffee making apparatus, in combination, a coffee pot comprising a container for water to be used in making coffee, means for heating and circulating the water in said container comprising a second container adapted to receive a variable predetermined quantity of water, heating means for converting the water in said second container into steam, and means for transmitting steam from said second container to said first named container, said last named means including means to cause intermingling of the transmitted steam with the water in said first named container to effect heating and circulating movement thereof, said heating means comprising electric heating elements adapted to be conductively connected by the water in said second container and rendered inoperative to transmit current for heating the water when the water falls below said elements whereby the time of heating and circulating water in said first named container will be governed by the quantity of water placed in said second container.

8. In coffee making apparatus, in combination, a coffee pot comprising a container for water to be used in making coffee, means for heating and circulating the water in said container comprising a second container adapted to receive a variable predetermined quantity of water, heating means for converting the water in said second container into steam, and means for transmitting steam from said second container to said first named container, said last named means including means to cause intermingling of the transmitted steam with the water in said first named container to effect heating and circulating movement thereof, said coffee pot being provided with a handle constituting a receptacle enclosing said second named container.

9. In coffee making apparatus, in combination, a coffee pot comprising a container for water to be used in making coffee, means for heating and circulating the water in said container comprising a second container adapted to receive a variable predetermined quantity of water, heating means for converting the water in said second container into steam, and means for transmitting steam from said second container to said first named container, said last named means including means to cause intermingling of the transmitted steam with the water in said first named container to effect heating and circulating movement thereof, said coffee pot being provided with a handle constituting a receptacle enclosing said second named container, said handle being formed with openings through which the level of water in said second named container may be visible.

10. In coffee making apparatus, in combination, a coffee pot comprising a container for water to be used in making coffee, means for heating and circulating the water in said container comprising a second container adapted to receive a variable predetermined quantity of water, heating means for converting the water in said second container into steam, and means for transmitting steam from said second container to said first named container, said last named means including means to cause intermingling of the transmitted steam with the water in said first named container to effect heating and circulating movement thereof, said coffee pot being provided with a handle forming a support for said second named container.

11. In coffee making apparatus of the percolating type, in combination, a container for water to be used in making coffee, a percolating pipe in said container, means for heating and circulating the water in said container comprising a second container adapted to receive a variable predetermined quantity of water, heating means for converting the water in said second container into steam, means for transmitting steam from said second container to said first named container, valve mechanism comprising a valve casing connecting said transmitting means with said percolator pipe and having ports therein connecting said percolating pipe with the interior of said container adjacent the bottom thereof whereby steam passing into said percolating pipe will be effective to draw water from said first named container and heat and circulate such water upwardly through the circulating pipe, and a valve in said casing movable to a position closing said ports upon interruption of the flow of steam through said casing, and a valve operable to connect said second container with the atmosphere when the pressure therein falls below that of the atmosphere.

12. In coffee making apparatus, in combination, a coffee pot comprising a container for water to be used in making coffee, and timing means for heating and circulating the water in said container comprising a steam generating compartment separate from said container and adapted to hold a variable quantity of water, connecting means for transmitting steam from said compartment to said container whereby the steam from said compartment will be effective to heat and circulate the water in said container, and heating means for converting the water in said steam generating compartment into steam, said connecting means being effective to prevent passage of water from said container to said steam generating compartment during the generation of steam to enable the time of heating and circulating of the water in said container to be measured by the quantity of water placed in said compartment.

13. In coffee making apparatus, in combination, a coffee pot comprising a container for water to be used in making coffee, and timing means for heating and circulating the water in said container comprising a steam generating compartment separate from said container and adapted to hold a variable predetermined quantity of water, the predetermined amount of water placed in said steam generating compartment being calculated according to the amount of water in said container, connecting means for transmitting steam from said compartment to said container, whereby the steam from said compartment will be effective to heat and circulate the water in said container, and heating means for converting the water in said steam generating compartment into steam, said connecting means being effective to prevent passage of water from said container to said steam generating compartment during the generation of steam to enable the time of heating and circulating of the water in said container to be measured by the quantity of water placed in said compartment.

14. Apparatus as claimed in claim 13, wherein the steam generating compartment is accessible to render the amount of water placed therein visible for facilitating the charging of said compartment with an amount of water calculated in accordance with the amount of water in said container to be heated and made into coffee.

15. In coffee making apparatus, in combination, a coffee pot comprising a container for water to be used in making coffee, and timing means for heating and circulating the water in said container comprising a steam generating compartment separate from said container and adapted to hold a variable predetermined quantity of water, the predetermined amount of water placed in said steam generating compartment being calculated according to the amount of water in said container, connecting means for transmitting steam from said compartment to said container, whereby the steam from said compartment will be effective to heat and circulate the water in said container, and heating means comprising electric heating elements adapted to be conductively connected by the water in said steam generating compartment and rendered inoperative to transmit current for heating the water when the water falls below said elements whereby the time of heating and circulating water in said container will be governed by the quantity of the water placed in the said steam generating compartment.

STEPHEN J. BACHARDY.